United States Patent [19]
Sugarman et al.

[11] 3,807,839
[45] Apr. 30, 1974

[54] DYNAMIC VISUAL ACUITY TESTING APPARATUS

[75] Inventors: Robert C. Sugarman, Williamsville, N.Y.; E. Donald Sussman, Burlington, Mass.

[73] Assignee: Calspan Corporation, Buffalo, N.Y.

[22] Filed: Jan. 28, 1972

[21] Appl. No.: 221,501

[52] U.S. Cl. .................. 351/36, 351/32, 351/37
[51] Int. Cl. ............................................ A61b 3/02
[58] Field of Search .................... 351/36, 32, 37

[56] References Cited
UNITED STATES PATENTS
3,355,237  11/1967  Simpson .................... 351/36 X
3,486,813  12/1969  Johnston .................... 351/36 X
3,415,594  12/1968  Aulhorn ..................... 351/36 X FOREIGN PATENTS OR APPLICATIONS
478,418  2/1953  Italy ........................ 351/36

Primary Examiner—Paul A. Sacher
Attorney, Agent, or Firm—Allen J. Jaffe

[57] ABSTRACT

A dynamic visual acuity measuring apparatus having a rotating disc containing a plurality of transparent target-pairs, one target of each presenting a uniformly gray appearance and the other target of each presenting resolvable dark and light areas, and lamps or the like for individually providing back-illumination for each target.

3 Claims, 4 Drawing Figures

PATENTED APR 30 1974　　　　　　　　　　3,807,839

DYNAMIC VISUAL ACUITY TESTING APPARATUS

BACKGROUND OF THE INVENTION

The present invention relates to visual acuity testing apparatus and, more particularly, to a dynamic acuity testing device.

Whereas conventional static acuity devices measure a sensory-perceptual ability to visually resolve stationary objects or images, a dynamic acuity device measures such ability to resolve moving objects or images.

Currently most all tests for driving ability include a measure of static visual acuity. While certainly this is a factor in determining a driver's ability there is much evidence indicating that dynamic acuity is possibly a stronger factor.

There is currently, a device for determining a person's visual ability to resolve the separation of two points when there is relative motion between the person and the points. This device employs a rotating slide projector which projects a moving checkerboard pattern onto a curved screen in front of the observer. Since the image is projected the possibilities of a degradation due to nonuniformities caused by the projection are increased.

Additionally, with the current device the duration of the presentation or image is dependent upon the angular velocity of the projector thus introducing initial reaction error correction procedures which are time consuming and inefficient.

SUMMARY OF THE INVENTION

The foregoing and other disadvantages of the prior art are overcome according to the teachings of the present invention which provides dynamic visual acuity apparatus which is compact, reliable and which will permit measurements under a wide range of illuminations.

Additionally, the duration of the presentation or viewing image is independent of angular velocity, thereby eliminating any lost time due to initial reaction time and initial error correction time.

The device according to the present invention comprises; means supporting a plurality of transparent presentations for rotation about an axis which coincides with an observer's line of sight, means for rotating said presentations at a predetermined constant angular velocity and means for separately back lighting one or more of the presentations as they rotate.

BRIEF DESCRIPTION OF THE DRAWINGS

For a fuller understanding of the present invention, reference should now be had to the following detailed description of the same taken in conjunction with the accompanying drawings wherein.

DESCRIPTION OF THE PREFERRED EMBODIMENT

Figure 1:
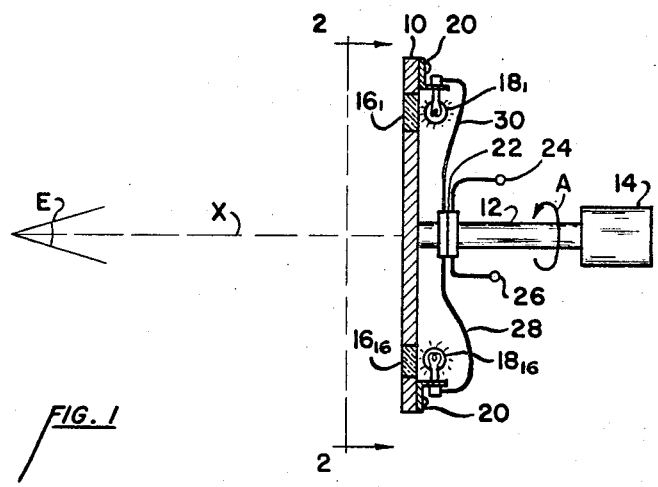
FIG. 1 is a schematic sectional representation of the apparatus according to the present invention.
Figure 2:
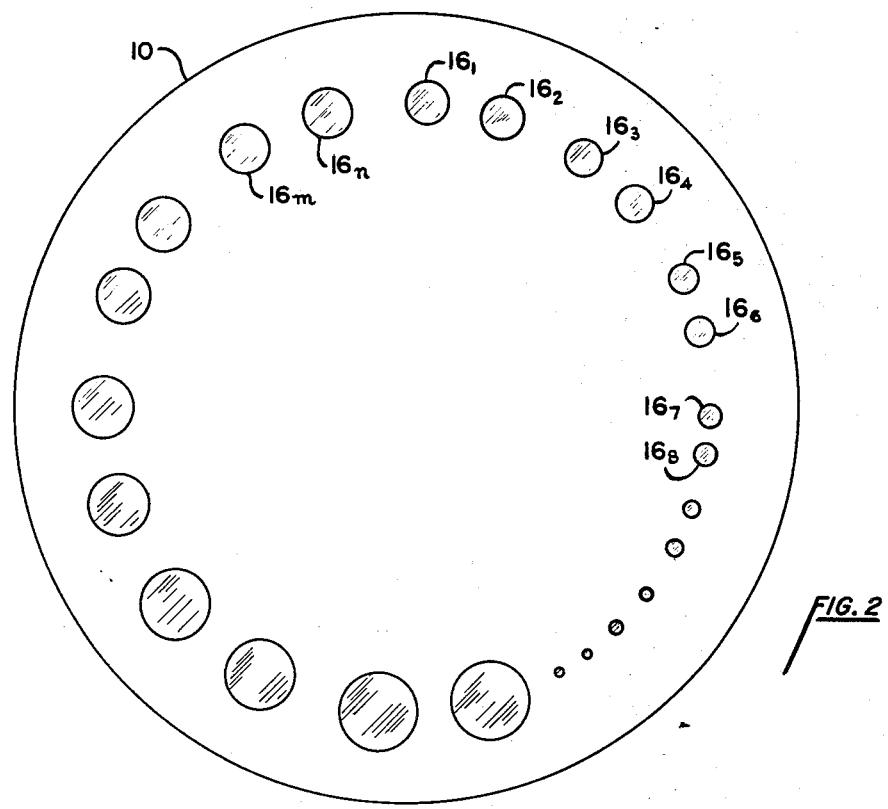
FIG. 2 is a view taken along line 2—2 of FIG. 1.

Referring now to the drawings and, more particularly to FIGS. 1 and 2, the dynamic visual acuity testing apparatus is illustrated as comprising a circular disc 10 suitably mounted for rotation in the direction of arrow A with a shaft 12 which is driven by a suitable variable-speed motor 14.

Disc 10 has a plurality of circumferentially spaced through-openings of various diameters or sizes which contain a plurality of transparent or translucent acuity test target pairs $16_1$, $16_2$, $16_3$, $16_4$, $16_5$, $16_6$ . . . $16_m$ $16_n$ as illustrated more clearly in FIG. 2. Each target pair varies, accordingly, in size and diameter. Suitable means is provided for individual back-illumination of each target of every target pair. Such means are schematically depicted by a plurality of lights $18_1$ . . . $18_{m+n}$ suitably secured to rear face of disc 10 by brackets 20 or the like. Suitable slip-rings 22 may be provided to transfer power from a source and controlling switch or switches (not illustrated) to stationary leads 24 and 26 to the lights 18 via conductors for each, as depicted at 28 and 30. The central axis $x$ of disc 10 coincides with an observer's line of sight as depicted at E.

Figure 3A:
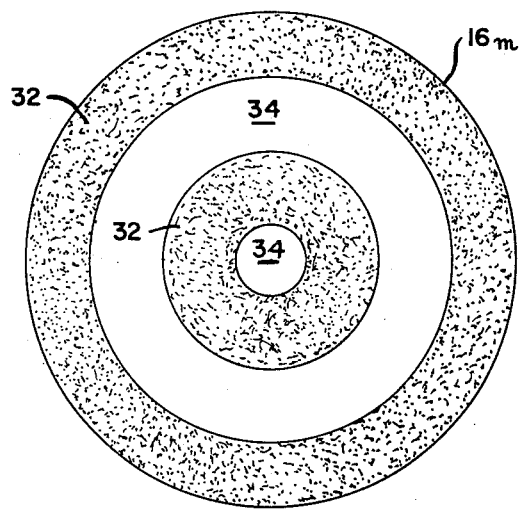
FIGS. 3a and 3b are enlarged views of typical pair of patterns employed to determine acuity with the apparatus of the present invention.
Figure 3B:
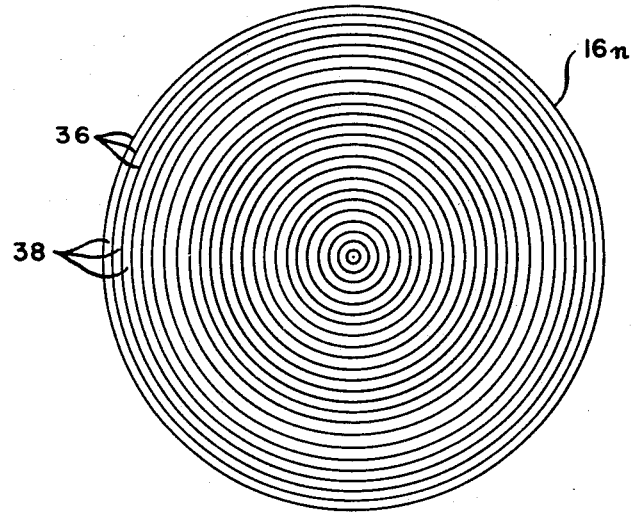

As illustrated in FIGS. 3a and 3b each target pair may consist of a test presentation $16_m$ and a uniformly gray presentation $16_n$. The test presentation may consist of a plurality of annular dark rings or areas 32 separated by annular light areas 34, the number and spacing between each dark and light ring being variable for each test target of each pair, such that the dynamic acuity for each individual can be determined within narrow limits. The uniformly gray presentation $16_n$ comprises a plurality of closely spaced dark rings 36 and light rings 38, the spacing between each being such that at any testing distance the separation is not resolvable and a uniformly gray target is presented to the observer. As is well known, a separation less than 1 minute of arc is not resolvable by humans. Thus the gray target would obviously have a line spacing such to be less than this amount. The total area represented by the dark rings 32 of test target $16_m$ is substantially equivalent to the total area of the dark rings 36 of target $16_n$ so that each target can transmit substantially identical illumination intensities to the observer.

In the operation of the apparatus according to the present invention, disc 10 is rotated at a constant angular velocity in a dimly lit environment such that the targets $16_m$, $16_n$ are not discriminable without additional illumination. An observer or subject is located at a fixed distance from disc 10 with his line of sight coincident with the rotational axis $x$. Selected individual targets are singly illuminated by the back-lighting afforded by lamps 18. The sequence of such illumination may be selected manually by the examiner or automatically. When a target is illuminated, it becomes apparent to the subject which target he is to identify and the back-illumination allows the subject to be tested at an appropriate light level. The uniformly gray targets $16_n$ for each test target $16_m$ can be illuminated with the test target dark as a check on the truthfulness of the subject's response. Thus, if a subject states he can resolve the separate rings on a particular test target, then the corresponding gray target can be illuminated and if the response is the same it is known that the subject was not correct in his identification.

The dynamic visual acuity can be measured either as the smallest test target that can be resolved at a particular angular velocity or the highest angular velocity at which a given test target can be resolved. Of course, with the disc 10 stationary static visual acuity may be determined.

Although a preferred embodiment of the present invention has been described, changes will occur to those skilled in the art. It is intended, therefore, that the present invention be limited only by the scope of the appended claims.

We claim:
1. A dynamic visual acuity measuring apparatus, comprising;
   A. a plurality of targets mounted for rotation about an axis corresponding to an observer's line of sight,
   B. means for rotating said targets at a known constant angular velocity, and
   C. illumination means for selectively lighting at least one of said targets as it rotates,
   D. wherein said targets comprise a plurality of variably sized first patterns,
   E. said targets further comprise a plurality of variably sized unresolvable patterns, and wherein
   F. said targets are arranged in pairs, each pair containing one of said first and one of said unresolvable patterns.
2. The apparatus according to claim 1, wherein;
   G. said first patterns comprise a plurality of spaced annular light and dark areas.
3. The apparatus according to claim 2, wherein;
   H. said unresolvable target comprises a plurality of closely spaced annular light and dark areas, the total dark area of which is substantially equal to the total dark area of said first pattern.

* * * * *